(12) United States Patent
Pourchot (10) Patent No.: US 7,167,078 B2
(45) Date of Patent: Jan. 23, 2007

(54) ELECTRIC, TELEPHONE OR NETWORK ACCESS CONTROL SYSTEM AND METHOD

(76) Inventor: Shawn C. Pourchot, 4029 Council Crest, Madison, WI (US) 53711

( * ) Notice: Subject to any disclaimer, the term of this patent is extended or adjusted under 35 U.S.C. 154(b) by 229 days.

(21) Appl. No.: 10/783,046

(22) Filed: Feb. 19, 2004

(65) Prior Publication Data

US 2005/0184856 A1    Aug. 25, 2005

(51) Int. Cl.
  *G05B 25/00*    (2006.01)
(52) U.S. Cl. .............. 340/5.61; 340/10.1; 340/825.69; 340/825.72; 340/5.1; 340/5.6; 340/5.2; 340/10.5; 340/10.52
(58) Field of Classification Search .............. 340/5.61, 340/10.1, 825.69, 825.72, 5.1, 5.2, 5.6
See application file for complete search history.

(56) References Cited

U.S. PATENT DOCUMENTS

| | | | |
|---|---|---|---|
| 4,302,624 A | 11/1981 | Newman | |
| 4,442,319 A | 4/1984 | Treidl | |
| 4,734,822 A | 3/1988 | Gilardoni et al. | |
| 4,899,129 A | 2/1990 | MacFadyen et al. | |
| 4,918,720 A | 4/1990 | Buehl | |
| 4,994,908 A | 2/1991 | Kuban et al. | |
| 5,174,773 A | 12/1992 | Jones | |
| 5,334,975 A | 8/1994 | Wachob et al. | |
| 5,389,740 A | 2/1995 | Austin | |
| 5,556,289 A | 9/1996 | Holbrook, Jr. | |
| 5,812,819 A * | 9/1998 | Rodwin et al. | ............... 703/23 |
| 5,879,184 A | 3/1999 | Lopez | |
| 6,317,028 B1 | 11/2001 | Valiulis | |

* cited by examiner

*Primary Examiner*—Brian Zimmerman
*Assistant Examiner*—Vernal Brown
(74) *Attorney, Agent, or Firm*—Donn K. Harms (57) ABSTRACT

An apparatus and method for controlling user access to electrical receptacles and telephone and network communications receptacles. The device features a short range radio receiver and one or a plurality of RF energized radio identification tags with transmittable identification transponder codes. The receptacle contains circuitry that detects the immediate presence of energized transponders with proper identification codes and only enables the electric, telephone or network access from the receptacle to become active if the correct matching transponder identification code is present. The tag is a small flexible device having one side that may be attached to the plug or the receptacle or interfaced therebetween. Access to the power or network is allowed for a defined duration of time or only so long as the transponder remains energized and transmits the identification code.

20 Claims, 3 Drawing Sheets

ELECTRIC, TELEPHONE OR NETWORK ACCESS CONTROL SYSTEM AND METHOD

FIELD OF THE INVENTION

The disclosed device relates to the field of the provision of a controlled access to a variety of electric, telephone and network receptacles providing utility or communication services. More particularly, it relates to control to access of such services through the use of radio frequency identification technology (RFID) in combination with switching technology. Access to most energy providing systems and communication providers is generally provided through common receptacles of all kinds offering open access to anyone who wishes to insert a matching plug into a properly configured receptacle. Further, in the case of small children inserting foreign objects into such receptacles, such unpredictable behavior can result in serious injury to them or damage to a system. The disclosed device herein provides a new and unique apparatus and method for precisely controlling the access to a wide variety of receptacles in many varied locations.

BACKGROUND OF THE INVENTION

Various cumbersome arrangements have been proposed in the past for preventing children from harm in the event they insert foreign objects into electrical receptacles. Other prior art addresses access control to utilities and communications receptacles. However, to date, there have not been any devices that will control the access for other phone or network receptacles conveniently.

There are numerous uses for the herein disclosed electric, phone or network control system and method. One preferred use would be for controlling the sale and duration of user access to publicly available receptacles and communication terminals. In this scenario a company or facility visited by the public such as an airport, hotel, motel or RV park would sell or provide the identification RFID tags to customers, thereby allowing them to access the utility or communications from the RFID cooperating receptacles that may be accessible to the general public. The receptacles would be accessible to anyone. However, they are configured to only provide power or data to those who have purchased the correct transponder tags to activate the respective receptacle being tapped.

Another example of a preferred embodiment of the device is the provision of unique properties for child-proofing a home or hotel room or other living space. This would be accomplished by only having the receptacles equipped with RFID controllers in the living space which are enabled to be active if the correct transponder on an RFID tag is attached to a plug being inserted into the receptacle. Having the receptacles default to the un-energized condition, absent the presence of the proper RFID tag, prevents current from flowing into foreign objects inadvertently or intentionally inserted into electrical receptacles in the house by small children. Additionally, this device will eliminate the cumbersome and sometimes ineffective plastic safety plugs, cover plates and protective boxes conventionally employed to prevent children from placing objects into the receptacles within the home.

The disclosed device may also be used to enforce compliance and access security in an office environment by allowing authorized employees to communicate with electrical, telephone or computer equipment by having the proper RFID tag equipped plugs for insertion into specific mating receptacles equipped with RFID Controller units having the proper matching transponder code. One example of this embodiment would be employed with office telephones which use the same plugs as standard Ethernet network plugs to prevent damage to sensitive telephone and electrical equipment. Plugging the telephone into a data port or vice versa may cause damage to the telephone or network. Tagging the inserted plugs to match and communicate with only the correct receptacles will ensure compliance and avoid inadvertent damage to office equipment.

In yet another preferred embodiment of the device which can be optionally employed with all of the various configurations of the device, a timer may be operationally inserted into the RFID controller unit so that a single identification tag is valid for a specified time period after the plug is first inserted into the receptacle. In this fashion the plug would allow current or data to flow for a specified interval before the tag's identification becomes invalid turning off the switch. The tag identification code then could be reset to be valid again for another specified interval. The receptacle could be enabled to respond to one or a plurality of different identification codes in this fashion. This action is similar to the resetting of the access code number on hotel key cards. An application for this addition would be metering or sale of use of public outlets, such as on airplanes, in airports or hotels, motels and RV parks. Another example would be an establishment offering Internet access for an additional fee. The patron would be given a disposable transponder RFID tag to attach to his laptop network cable plug, or a chord with the tag in it, or some type of wireless communication device with the RFID tag operatively inserted. When the laptop cable is plugged into the receptacle or the wireless communication device plugged into the computer, current flow starts the timer for that RFID tags identification and access is enabled. After a determined time period the receptacle no longer responds to the individual RFID tags identification code and access is shut off. The receptacle would reset after a defined period of time so that the RFID tags identification code would once again be active if plugged in. Such a device would allow a hotel or trailer park or the like to prevent non-paying customers from gaining access to the receptacles equipped with RFID control units while having an inexpensive disposable method of enabling access to paying clients. This would allow the hotel or other establishment to sell utility or network access to paying users and simply issue them an RFID transponder that when placed sufficiently close to the receptacle to be come energized by the broadcast energy from the receptacle, would activate a switch in the receptacle to provide a communicating circuit to a plug. The user would then have power, or network access so long as the transponder is located close enough to the receptacle to be energized or for a determined time period of a timer is included in the circuit. The RFID transponder could also be encoded to broadcast an authorization code that would turn on the receptacle if the code matched one preprogrammed into the device. These codes could be updated remotely after each user or as needed.

REFERENCES CITED

U.S. Pat. No. 4,302,624 of Fredric M. Newman discloses a wall electrical outlet protector for children which is integral with or mountable on an electric outlet wall plate and which includes doors swingable in the plane of the wall against a return spring bias to an open position to allow access to the wall outlet. Inter-engaging edges present prying of the doors away from the unit and optional detents may be utilized to provide resistance to opening of the doors. The protector may be easily applied without disturbing the electrical wiring but can only be removed by the unscrewing of the plate retention screw using a screwdriver.

This patent describes an electrical outlet receptacle protector for children but does not describe the RFID radio frequency identification technology, nor would this device be useable for a variety of different kinds of receptacles in the electronics field.

U.S. Pat. No. 4,442,319 of Bernhard L. Treidl describes a control system for switching on or off appliances or other electrical devices at pre-determined or pre-selected times. The timing or sequencing of switching on or switching off any appliances can be set or changed as desired by telephoning the system from a remote telephone and providing appropriate encoded instructions through the telephone lines. The system includes a central clock driven controller and one or more remote addressable switching means which communicate with the central controller through conventional power lines. The central controller includes a power line interface for generating and impressing control signals on the power lines, a telephone interface and tone decoder for receiving incoming telephone instructions, and a microprocessor and memory for processing incoming instructions and operating the power line interface. The system includes feedback means for determining the operational status of the remote addressable switching means. Each remote addressable switching means includes a power line interface for receiving incoming signals, a power switch for switching on or off an appliance, and control logic for selecting appropriate incoming signals and operating the power switch.

This patent describes a control system for remotely switching on and off electrical appliances but does not offer the unique capability of preventing an individual from inserting the wrong plug into a receptacle or for preventing unauthorized individuals from using specific receptacles.

U.S. Pat. No. 4,735,822 of Giovanni Gilardoni tells of an electronic safety device for the current feed of a hair dryer or similar domestic electrical appliance that shuts off the appliance in the presence of moisture or water on electrically conducting parts thereby avoiding a dangerous short circuit. A pair of closely spaced grids are provided, each of which is in series between a pair of connection wires that trip a control circuit which normally maintains an energized relay for closing a control switch of an electrical feed line of the appliance. A supplementary control current continuously flows through each grid and its associated wires.

This patent describes a safety turn off switch for an appliance but does not involve the receptacle that the electricity is coming from.

U.S. Pat. No. 4,899,129 of David J. MacFadyen et al. teaches of an automated system for providing different services within a house that includes an appliance coordination data network for communicating relatively low speed appliance digital data within a house, a high capacity data network for transferring high speed digital data within the house, an energy distribution system for distributing energy throughout the house, an analog services distribution system for distributing conventional analog signals throughout the house and a video services distribution network for distributing video services throughout the house. The appliance coordination network interfaces with the energy distribution system to control the flow of energy to appliances throughout the house responsive to a digital request or interrogation signal that is emitted from the appliance itself.

This patent describes a highly sophisticated expensive system for providing different services throughout a house but does not offer the unique inexpensive system disclosed within this patent that can be a retrofit to one or more receptacles within a house or office.

U.S. Pat. No. 4,918,720 of George T. Buehl relates to a control circuit device of a desk lamp apparatus that is used in association with a telephone set. This circuit device may be actuated by an input signal from a telephone line for the duration of a call in order to provide a full light source over the place surrounding the telephone. A delay circuit is provided to prolong the actuated state of the circuit device for a period of time after a phone conversation is over.

This patent describes a unique device for turning on a light when the telephone rings but does not deal with the control of a variety of receptacles.

U.S. Pat. No. 4,994,908 of Curt M. Kuban additionally describes an interactive room status/time information system having a terminal associated with a television comprising a processor for processing data, an associated memory for storing operation data and control algorithms, a keypad with remote control for inputting information, a character generator responsive to the processor for generating a multiple character, multiple line display, a power supply input, and a cable transmission link for communication at television frequencies with a system manager. A maid or inspector can send status information from a hotel/hospital room terminal over a cable television system to a system manager location. The status of a room for occupancy is determined by a two-step procedure. Input from both a maid and an inspector must be received before a room has a ready-for-occupancy status. Screens of compiled room status and historical data can be displayed at the system manager. Also, certain screens of room status data may be displayed on an associated television at the room terminal. Functions can be performed at the system manager location including searching stored status information for historical data of a particular room or maid. In accordance with a further time control feature of the present system, a hotel guest may actuate a wake up mode of operation of a room terminal through a terminal keyboard or remote control. The system manager subsequently polls the terminal to determine if the room terminal is properly operating or if the wake-up alarm has been responded to. If not, hotel personnel may be dispatched to the room.

This patent describes a sophisticated system designed for the implementation into hotels and the like for improved control and supervision in the maintenance of the facility but does not offer the capability of controlled access of the electric, telephone or network receptacles in the rooms for the possibility of increased revenues.

U.S. Pat. No. 5,174,773 of Steven J. Jones discloses a child-proof plug cover that includes a covering device designed to overlie an existing double electrical receptacle as commonly found mounted on a wall. The device is sized to allow receipt of two electrical plugs as plugged within the receptacles with their cords extending outwardly from the covering device. The covering device includes two door mechanisms each of which allows insertion of a plug with subsequent closing of a door mechanism to prevent a child from tampering with the device. The covering device may also be sized to preclude a child from pulling an electrical plug out of the wall receptacle.

This patent describes another child proof cover for an electrical receptacle but does not offer the capability of ceasing the current to flow to the receptacle unless the proper plug is inserted with a transponder identification RFID tag outlined within this patent.

U.S. Pat. No. 5,334,975 of David E. Wachob et al. teaches of a method and provides for transmitting a time reference throughout a residence or other facility for use by appliances operating within the facility. A time reference is received from the head end of a cable television (CATV) system at the subscriber converter and is retransmitted to set the internal clock timers of residential appliances throughout the house. The time reference is received by the CATV converter, then encoded and modulated for transmission on the residential AC wiring system that also carries AC power to all of the appliances in the house. Individual appliances receive the encoded time reference from the AC power line, demodulate the received signal and use the received time reference to set its internal clock timer. In such manner, a residential appliance does not need to have its internal clock set by the consumer.

This patent describes another sophisticated electronic method of controlling the appliances within a house but will not keep individuals from putting the wrong plug into a receptacle.

U.S. Pat. No. 5,398,740 of Kathleen A. Austin describes a new and improved safety cover for electrical outlets for enclosing an electrical wall outlet for minimizing personal injury due to electric shock and additionally for providing a tamper proof device to prevent unauthorized connection or interruption of electrical power to an appliance. The safety cover for electrical outlets is comprised of a box of electrical non-conducting material fixedly connected to a wall having an electrical wall outlet such that the electrical outlet is surrounded by the box while being accessible within the box, the box additionally having a hinged cover thereon whereby the electrical outlet may be fully enclosed when the cover is closed. The box has a plurality of notches therethrough, where through electrical line cords may removably extend when the box cover is closed, the box also having a latch whereby the cover is releasably retained in the closed position whereby the electrical outlet and plugs connected thereto are fully enclosed to prevent electrical shock due to tampering, and to preclude unwanted connection or disconnection of critical electrical equipment.

This patent describes a cumbersome safety cover box for electrical outlets but does not control the current from the receptacle and would be extremely awkward to install on all of the outlet receptacles of a house.

U.S. Pat. No. 5,556,289 of Ira C. Holbrook, Jr. discloses a safety cover for an electrical outlet including a hollow rigid container having a back wall with a periphery extended outwards therefrom and thereby defining a hollow interior, an opening to the interior, and a rim bounding the opening, the back wall further including a plurality of socket holes and a screw hole formed thereon and with the socket holes and screw hole alignable with a screw hole and corresponding socket plugs of an electrical receptacle; a rigid lid positionable over the opening of the container in contact with the rim, the lid further having a plurality of plug holes formed thereon and with each plug hole separately alignable with a socket hole of the back wall of the container, and a plurality of rigid doors with each door positionable within a plug hole of the lid and thereby creating a through hole for receipt of an electrical cord; and a coupling mechanism for removably coupling each door within a separate plug hole of the lid.

This patent describes another cumbersome safety cover box for electrical outlets but does not control the current from the receptacle and would be extremely awkward to install on all of the outlet receptacles of a house.

U.S. Pat. No. 5,879,184 of Juan A Lopez relates generally to weatherproof electrical enclosures and more specifically it relates to an outdoor electrical outlet protector. The outdoor electrical outlet protector consists of a waterproof extension cord with two electrical receptacles and a built-in timer, to safely connect an outdoor electrical outlet with exterior Christmas lights and security lights in a house.

This patent describes an exterior weatherproof electrical enclosure with a timer to turn on and off Christmas and security lighting but does not offer any practical protection for phone or network receptacles.

U.S. Pat. No. 6,317,028 of Carl Valiulis tells of an electronic identification, control, and security system that is comprised of a unique identification code associated with each manufactured article, a password code, communication circuitry capable of transmitting the password code to the manufactured articles, and appliance disabling circuitry. The appliance disabling circuitry may be integrated with the manufactured articles and precludes operation of the manufactured articles upon receipt of the password code. The communication circuitry preferably includes RFID technology to transmit the password code to the article and receive the unique identification code from the article. Such system deters theft of the articles. A method for deterring theft of manufactured articles includes the steps of providing a unique identification code for each manufactured article, transmitting a password via radio frequency to each manufactured article, and disabling operation of each manufactured article in response to receipt of the password. A manufactured appliance comprises security and control logic circuitry, data storage memory, a unique identification code stored in the memory, and communication circuitry for receiving a transmitted password. The security and control logic disables operation of the manufactured appliance in response to receipt of the password.

This patent tells of an electronic identification, control, and security system that is comprised of a unique identification code associated with each manufactured article. Although this patent uses the RFID technology, it involves the incorporation of this invention into manufactured appliances and could not be simply attached to the plugs of the appliance and would not work effectively on telephone or network access receptacles.

The vast number of patents relating to the control and safety of electrical receptacles verifies the great importance and the value related to this field. While the prior patents and prior art include commercial devices that have been successful to a certain extent, it is nonetheless clear that substantial room exists for affecting an advance in the art, which overcomes these shortcomings in a practical and efficient manner. None of these previous efforts, however, provides the benefits attendant with the present invention. The present invention achieves its intended purposes, objects and advantages over the prior art devices through a new, useful and unobvious combination of method steps and component elements, with the use of a minimum number of functioning parts at a reasonable cost to manufacture, and by employing readily available materials.

In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for designing of other structures, methods and systems for carrying out the several purposes of the present invention. It is important, therefore, that the claims be regarded as including such equivalent construction insofar as they do not depart from the spirit and scope of the present invention.

SUMMARY OF THE INVENTION

The present method and apparatus overcome many of the problems that have plagued prior systems by including the most up-to-date radio frequency identification technology available. A preferred embodiment of this invention describes an electric, telephone or network access receptacle with a controller unit using RFID (radio frequency identification) technology, consisting of a short-range RFID transceiver module such as the Texas Instruments model 2000 microreader and data processor, incorporated into a RFID control unit or attached to the receptacle, or as a separate intermediate part, in combination with one or more inexpensive matching RFID identification transponders such as the Texas Instruments model RI-103-11A or similar RF field energized transmitting devices, referred to in this document as RFID tags attached to or incorporated onto the plug or as an intermediate part between the plug and the receptacle. The unique combination of the RFID control unit containing an electronic module that detects the immediate presence of a remote RFID transponder when the transponder is energized and broadcasts a code will only enable the electrical, telephone, network access, or other utility or communication receptacles to become active if the correct matching transponder identification RFID tag is in proximity to the receptacle when a mating plug is engaged. The RFID tag is a small flexible device that is easily attached to or incorporated into an electric, telephone or network plug. Each receptacle RFID control unit would be capable of detecting and responding to one or more of these cheap disposable RFID tags containing a single identification transponder. The operatively mounted receptacle RFID communication control unit ensures that the correct authorized equipment has power communicated to it. The receptacle face is the same size and shape as a normal receptacle but is equipped with a RFID control unit using inexpensive short-ranged RFID receivers with one or more single identification RFID tags to match the receiver in the RFID control unit.

All of the embodiments of the device may have the option of incorporating an activation module having a timer in the RFID control unit so that a single identification RFID tag is valid for a specified time period after the plug is first engaged with the receptacle or current starts flowing, thereby allowing current to flow or other electrical communication for a specified interval before the RFID tag's identification code becomes invalid. The RFID tag identification code could then be reset to be valid again after another specified interval. The receptacle could be enabled to respond to one or more identification codes in this fashion.

A first alternate embodiment of the electric, telephone or network access control system and method would employ the RFID tag or RFID control unit, either with the timer or without, as an intermediate part to be used between a conventional receptacle and a plug equipped with a RFID tag or a conventional plug and a receptacle equipped with a RFID control unit.

A second alternate embodiment of the electric, telephone or network access control system and method will have the RFID tags incorporated into the door key cards of hotels and motels where the plug prongs protrude through orifices in the door key cards to be inserted into the receptacles to activate the RFID control units.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

THE OBJECTS OF THE INVENTION

An object of this invention is to create a means to control the use of an electric, telephone or network access receptacle.

Another object of this invention is to control the use of an electric, telephone or network access receptacle by the means of radio frequency identification or RFID technology.

An additional object of this invention is to use one or more inexpensive disposable RFID tags to activate a RFID control unit accessing the circuitry.

Yet another object of this invention is to create a method to control the use of publicly available electrical and communication receptacles.

A further object of this invention is to create a method to program the RFID control unit to use a variety of RFID tag transponder identification codes at different times.

Yet another object of this invention is to create a method to control the use of receptacles in hotels, motels and RV parks.

Still another object of this invention is to create a method to control the use of receptacles, primarily telephone and network receptacles in business offices.

An additional object of this invention is to create a method to control the time that receptacles are in use.

A further object of this invention is to create an electrical, telephone or network receptacle control system and method to child proof all the electrical outlets in a home with children.

Still another object of this invention is to create an electric, telephone or network control system that can easily be installed in existing receptacles and plugs or be incorporated within new receptacles and plugs.

A final object of this invention is to create a simple and inexpensive system and method to control electric, telephone and network receptacles.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred and alternate embodiments in addition to the scope of the invention defined by the claims taken in conjunction with the accompanying drawings.

BRIEF DESCRIPTION OF THE DRAWINGS

For a fuller understanding of the nature and objects of the invention, reference should be had to the following detailed description taken in conjunction with the accompanying drawings in which.

DETAILED DESCRIPTION OF THE PREFERRED EMBODIMENTS

Figure 1:
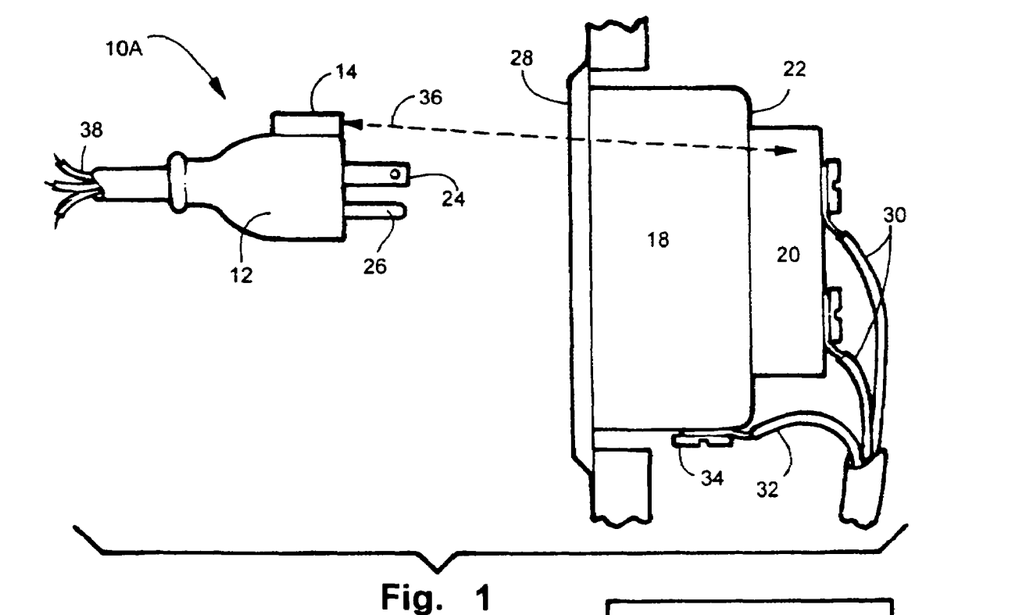
FIG. 1 depicts a side elevation of the preferred embodiment with a conventional electrical plug having a RFID tag mounted on the top adjacent to a conventional electrical access receptacle with a RFID control unit mounted on the back.

Referring now to the drawings, wherein similar parts of the invention are identified by like reference numerals, there is seen in FIG. 1 the electric, telephone or network access control system and method 10A shown as a side elevation of the preferred embodiment with a conventional electrical plug 12 having a RFID tag 14 mounted on the top surface 16 or attached to the cord using other means of attachment. In use, to activate electrical communication, the RFID tag 14 engaged on the distal end of the wire or cord is placed adjacent to a conventional electrical access receptacle body 18 with a RFID control unit 20 mounted on the back side 22. It must be understood at this time that the illustration shows a conventional AC plug 12 and AC receptacle body 18, but the unique features of this invention enable the device and method to be incorporated into a wide variety of plugs and receptacles including those of the telephone and the Ethernet network such as conventional category five cabling. The AC plug 12 will have the contact prongs 24 and if required, the ground connector 26, that engage with conventional orifices or electrical connectors commonly located in the faceplate 28 of the access receptacle body 18. While shown as an AC plug, the device also works just as well with receptacle bodies which are adapted for engagement with telephone and network cords which have plugs adapted for engagement with appropriately placed prongs in such receptacles and such is anticipated fully within the scope of this patent. There also exist fiber optic cables which cooperatively engage receptacles which transmit light through connecters engaged with other fiber optic cables and it is anticipated the device herein disclosed will be used for that purpose also.

As shown in an AC circuit, the interconnecting wires 30 providing electrical power of electronic communication will communicate through the RFID control unit 20 and the ground wire 32 will connect to the ground lug 34 on the access receptacle body 18. Ultimate communication from the interconnecting wires with the contact prongs 24 is dependent on the RFID control unit activating a switching means to allow that communication. The duration of the communication allowed, as noted, can either be for a prefixed duration or continuous, as long as the signal is received. This unique combination of the RFID control unit 20 containing circuitry that detects the immediate presence of an authorized remote RFID tag 14 by the means of the short range radio RFID signal 36 will only enable the electric, telephone or network access receptacles to become active if the correct matching transponder identification RFID tag 14 is present in the energized RFID tag 14 and received back by the RFID control unit.

Each access receptacle body 18 with a RFID control unit 20 is preprogrammed to respond to the code broadcast to it from one or more of these disposable RFID tags 14, each of which is programmed with an identification transponder code which is broadcast back to the adjacent control unit if the RFID tag 14 is sufficiently close to receive the broadcast RFID signal 36 to energize it to return the transponder code. In use, the RFID tag would be provided to a user who would attach it to the distal end of the cord having the electrical plug 12 or other engaging plug thereon. When the RFID tag 14 is engaged or moved sufficiently proximate to receive the RFID broadcast signal 36 of RF, it will become energized and broadcast back either a continuous signal on a designated frequency or its individual preprogrammed transponder code. In cases of a continuous frequency, then the receptacle 18 would be energized by the activation module 44A so long as the signal is received. In cases of the transponder code being broadcast in the radio transmission, if it is matched to a code stored in the transponder module 42, it will activate the activation module 44A to complete the circuit and to energize the receptacle 18. Activation would continue for either a predetermined amount of time or for the duration of receipt of the radio signal or the activation code depending on the desired result. As noted earlier, the activation codes and the time durations allowed could be updated from a remote location as needed to allow the system to provide more or less access. As noted above, while the figures depict an AC receptacle, a telephone jack or network cable jack would work essentially the same in that a plug would be engageable with the access receptacle 18 and the circuit communicating with the appropriate wires of the access receptacle would only be allowed a complete communication by the activation module 44A if the correct transponder code is received from the RFID tag 14 mounted on or otherwise engaged with the plug 12. In either mode as an AC power receptacle or a communications receptacle for network or phone cords, the access receptacle body 18 with the operatively attached RFID control unit 20 ensures that only authorized equipment has electrical power and/or an electrical communication connection provided to the appliance being engaged.

Figure 2:
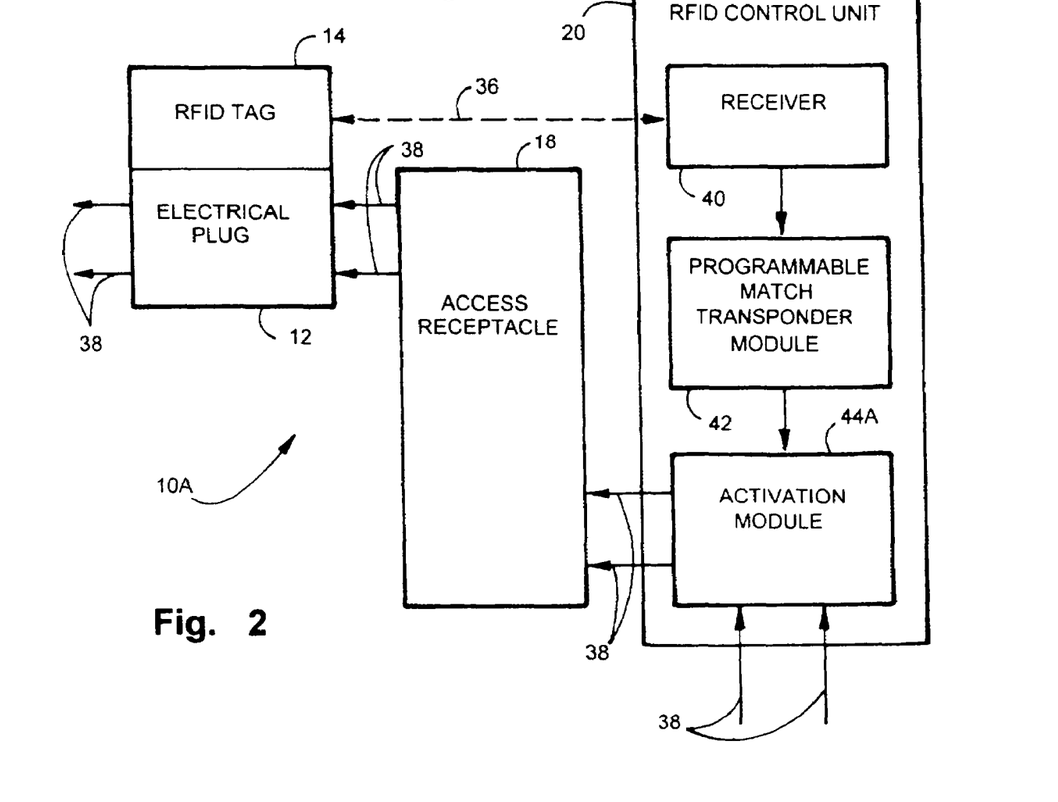
FIG. 2 depicts a block diagram of the preferred embodiment of the electric, telephone or network access control system and method.

FIG. 2 depicts a block diagram of a preferred embodiment of the electric, telephone or network access control system and method 10A with the electrical current 38 coming through the conventional electrical plug 12 with the RFID tag 14 attached to the distal end of the cord near or on the plug 12. In use, a short range RFID signal 36 is transmitted to the RFID tag 14 from the transreceiver 40 within the RFID control unit 20. Power for this transmission is continually provided by the power being fed to the control unit 20 from the grid or the communications network. The short range RFID signal 36 is intentionally broadcast a short distance by using low power and if received by the RFID tag 14, the RF signal energizes the tag circuitry to broadcast an identification code programmed into the RFID tag 14 which is then communicated to the programmable match transponder module 42 and then to the activation module 44. A means to read and compare the broadcast code to authorized codes stored in memory such as a computer or preprogramed chip or other such means would be used to make the identification. If the RFID tag 14 transponder identification code broadcast from the RFID tag 14 when energized by the RFID signal 36 matches a preprogrammed identification code stored in onboard memory of the control unit 20 such as in memory in the programmable match transponder module 42, it will initiate a means for electrical switching such as the activation module 44 to allow the electric current 38 to pass through to the access receptacle 18 and into the plug 12 engaged.

Figure 3:
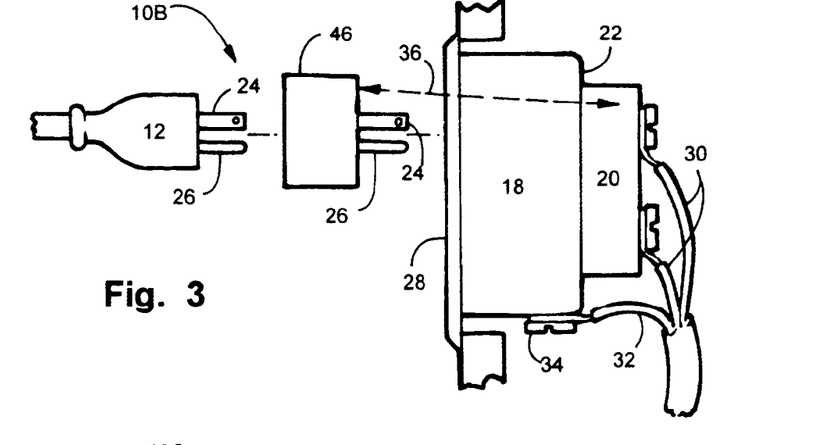
FIG. 3 depicts a side elevation of the first alternate embodiment of the electric, telephone or network access control system and method with a conventional plug using an intermediate RFID tag and the RFID control unit on the back of a conventional access receptacle.

FIG. 3 depicts a side elevation of the first alternate embodiment of the electric, telephone or network access control system and method 10B depicting a conventional plug 12 using an intermediate RFID tag 46 and the RFID control unit 20 on the back 22 of a conventional access receptacle body 18. This embodiment attaches a socket bearing RFID tag 46 to the plug 12 as an interface between the plug 12 and the receptacle body 18 which then engages the prongs on the RFID tag 46. This embodiment might also allow for a very low voltage to be communicated through the wires as the means to electrically energize the RFID tag 46 should RF energy not be desirable for this purpose for some reason. In use, instead of being given an attachable RFID tag 14, the user would be given the receptacle interfacing RFID tag 46 which would operate in the same fashion by allowing electrical communication to the appliance or electrical device only if the appropriate code is transmitted from the energized RFID tag 46.

Figure 4:
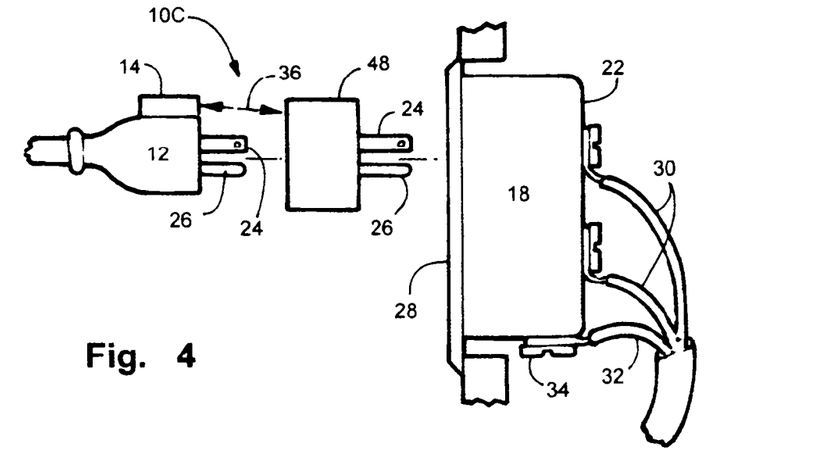
FIG. 4 depicts a side elevation of a second alternate embodiment with an RFID tag attached to the electrical plug and an intermediate RFID control unit that will plug into the access receptacle.
Figure 5:
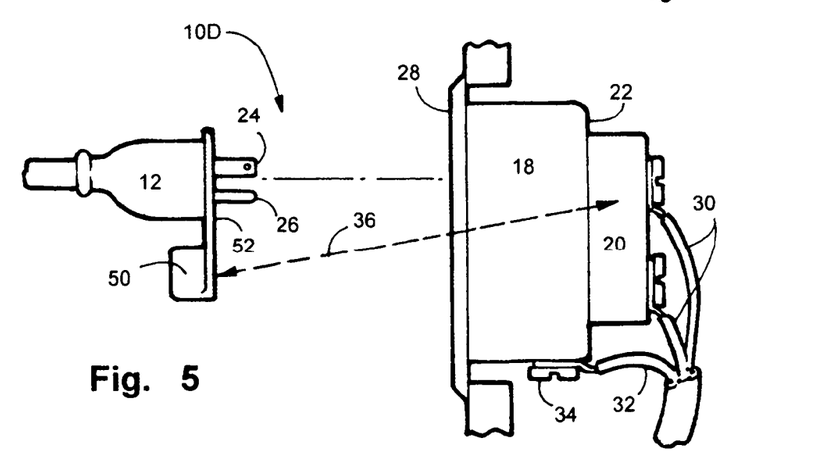
FIG. 5 depicts a side elevation of a third alternate embodiment with the RFID tag mounted on a card removable that is removable from the electrical plug.

FIG. 4 shows a side elevation of the second alternate embodiment 10C with the optional intermediate RFID control unit 48 to be used to connect a conventional electric plug 12 with a RFID tag 14 mounted on it to a conventional access receptacle body 18. A third alternate embodiment of the electric, telephone or network access control system and method 10D will operate with an intermediate RFID tag 50 attached to a removable card 52 with orifices 54 for the prongs 24 and an orifice 56 for the ground connector 26. The RFID control unit 20 containing circuitry that detects the immediate presence of a remote RFID tag 50 by the means of the short range RFID signal 36 will activate the RFID control unit 20 to open the electrical current 38 to the conventional electric plug 12.

Figure 6:
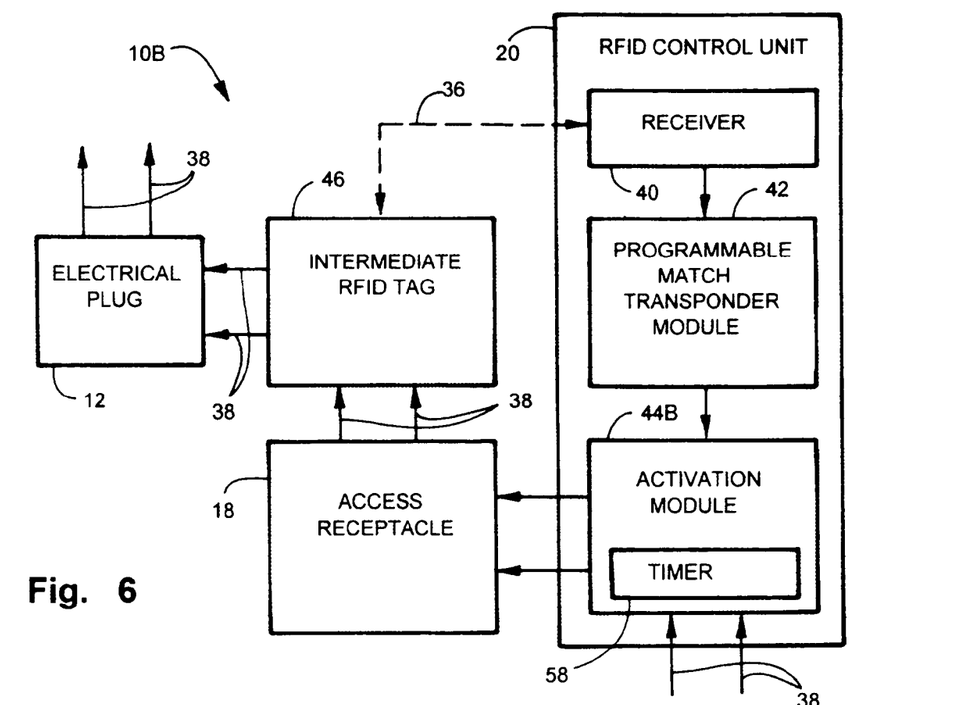
FIG. 6 depicts a block diagram of the first alternate embodiment with a conventional plug using an intermediate RFID tag and the RFID control unit on the back of a conventional access receptacle.

FIG. 6 depicts a block diagram of first alternate embodiment of the electric, telephone or network access control system and method 10B. The electrical current 38 comes through the conventional electric plug 12 by the means of the intermediate RFID tag 46. The short range RFID signal 36 is transmitted between the RFID tag 46 to the receiver 40 within the RFID control unit 20. The short range RFID signal 36 bearing the proper code is transmitted to the programmable transponder module 42 which will then communicate approval to the activation module 44B on determining if the code authorizes the connection to be made. The device may optionally be equipped with a means for timing such as a timer 58 to control the time period for a delayed opening of the activation module 44B, or, for a preprogrammed authorized length of time the activation module 44B allows electrical current, optical data, or data flow into the plug from the receptacle body 18. If the RFID tag 46 transponder identification code transmitted by the energized RFID tag 46 matches the stored RFID control unit 20 transponder identification code, the activation module 44 will allow the electric current 38 to pass through to the access receptacle body 18 and into the plug 12.

Figure 7:
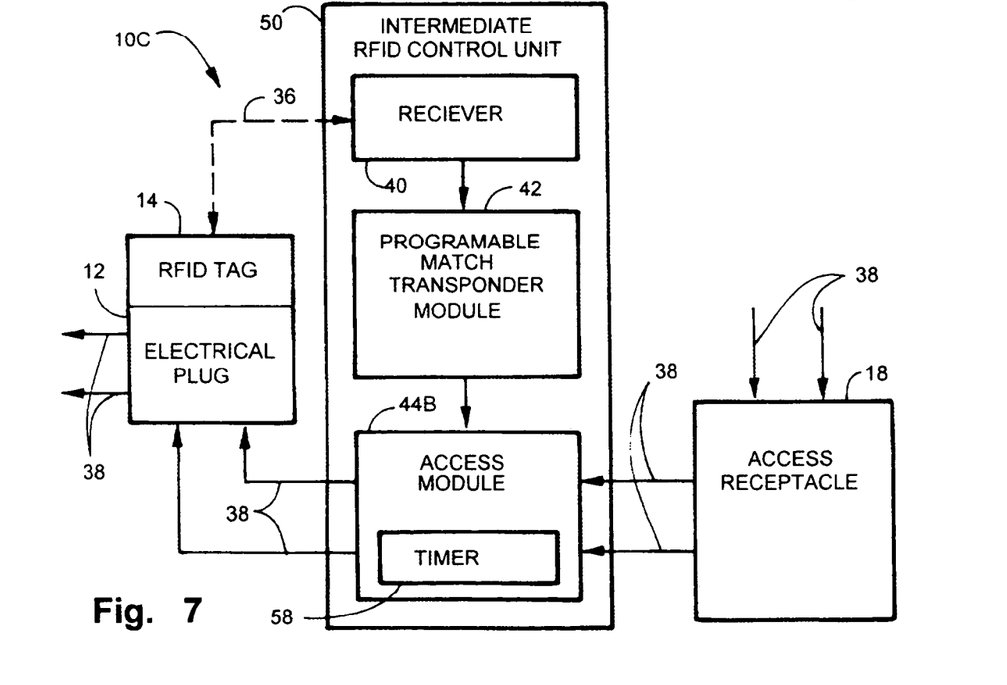
FIG. 7 depicts a block diagram of the second alternate embodiment with an RFID tag attached to the electrical plug and an intermediate RFID control unit that will plug into the access receptacle.

FIG. 7 depicts a block diagram of the second alternate embodiment of the electric, telephone or network access control system and method 10c with an RFID tag attached to the electrical plug 12 and an intermediate RFID control unit 50 that will plug into the access receptacle body 18. Again if the RFID tag 14 transponder identification code matches the intermediate RFID control unit 50 transponder identification code, the activation module 44B will open to allow the electric current 38 to pass through to the access receptacle body 18 and into the plug 12.

All of the embodiments of the device will have the option of incorporating an activation module 44 with a timer 58 in the RFID control unit 20 so that a single identification RFID tag 12, 46 or 50 is valid for a specified time period after the conventional electrical plug 12 is first inserted allowing electrical current 38 to flow for a specified interval before the tag's identification becomes invalid. The RFID tag 12, 46 or 50 identification code then could be reset to be valid again after another specified interval. The RFID control unit 20 could be enabled to respond to one or more identification codes in this fashion.

In a method, using the components herein disclosed, a minimal number of steps would occur to enable a temporary user of a communications network or electrical power grid to obtain access to the desired receptacle for a desired period of time. This would entail the steps of:

Issuing a radio frequency activated identification tag to a user with this issued tag being programmed with an activation code that is broadcast when energized by a receptacle mounted control unit with a transceiver which is preprogrammed to accept activation code when broadcast. Then, having the user attach the issued tag to a plug adapted for engagement with the receptacle. Having the user engage the plug with the receptacle. Finally, having the control unit activate a switching means to communicate electrical power from the receptacle to the plug, only if the activation code broadcast by the energized tag matches preprogrammed proper authorization codes stored in memory of the control unit.

This method could be altered and instead of attaching the tag to the plug, the user would move the issued tag to a proximity adjacent to the receptacle sufficiently close to become energized by RF energy transmitted by the control unit and transmit the activation code back to the control unit. In this fashion the tag might be interfaced in between the plug and the receptacle by plugging into both the plug and the receptacle or just attached in some fashion to the receptacle or plug at a location sufficient in proximity to the receptacle to be energized and transmit an authorization code that may be received by the control unit which would then activate a means to a connected state for switching to communicate electrical power through the wires entering the receptacle to the engaged plug.

Finally, either of the above methods could be altered to include a preprogrammed time period for the switching means to continue in the connected state. In this fashion the user would be issued the tag and go through the step of placing it sufficiently close to the receptacle to allow the tag to energize and broadcast the authorization code. Once the control unit activates the means for switching to the connected state, a timer would commence timing the period of activation and move the means for switching to an inactivated state de-energizing the plug after a set period of time. This set period of time may be determined by matching the broadcast authorization code to such codes in memory of the control unit which have authorized time periods for activation, or by just setting a preset time period in which the control unit will move the switching means to and from the energized state.

The electric, telephone or network access control system and method 10A, 10B and 10C shown in the drawings and described in detail herein disclose arrangements of elements of particular construction and configuration for illustrating preferred embodiments of structure and method of operation of the present invention. It is to be understood, however, that elements of different construction and configuration and other arrangements thereof, other than those illustrated and described may be employed for providing an electric, telephone or network access control system and method 10A, 10B and 10C in accordance with the spirit of this invention, and such changes, alternations and modifications as would occur to those skilled in the art are considered to be within the scope of this invention as broadly defined in the appended claims.

Further, the purpose of the abstract herein is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

What is claimed is:

1. A receptacle access control system comprising:
   a receptacle adapted for cooperative engagement with a plug having plug connectors;
   said receptacle having receptacle connectors adapted to engage with said plug connectors when said plug is engaged with said receptacle;
   said receptacle connectors communicating through a means for switching, with a means for transmission of electrical energy;
   said means for switching having a connected state wherein electrical energy is communicated to said receptacle connectors, said switching means having a disconnected state interrupting communication of said electrical energy to at least one of said receptacle connectors;
   a controller communicating with said means for switching, said controller changing said means for switching to either of said connected state or said disconnected state;
   means for broadcasting radio frequency energy;
   a transponder, said transponder having a static state and having an energized state when placed sufficiently adjacent to said means for broadcasting radio frequency energy;
   said transponder broadcasting an authorization radio signal only when in said energized state; and
   said controller having a means to receive said authorization radio signal, said controller changing said means for switching to said connected state for the duration of time said authorization radio signal is received, whereby communication of electrical energy is allowed from said receptacle through said plug only so long as said authorization radio signal is broadcast by said transponder located sufficiently adjacent to said controller for receipt by said controller.

2. The receptacle access control system of claim 1 additionally comprising:
   said transponder programed with an authorization code,
   said authorization radio signal communicating said authorization code in said authorization radio signal; and
   said controller changing said means for switching to said connected state only if said authorization code matches a predetermined authorization code.

3. The receptacle access control system of claim 2 additionally comprising:
   said transponder continuously broadcasting said authorization code;
   said controller changing said means for switching to said connected state only so long as said authorization code is received from said transponder.

4. The receptacle access control system of claim 1 additionally comprising:
   means for timing in communication with said controller, said means for timing capable of signaling the end of a determined time period; and
   said controller changing said means for switching to said connected state until said end of said determined time period is communicated from said means for timing.

5. The receptacle access control system of claim 2 additionally comprising:
   means for timing in communication with said controller, said means for timing capable of signaling the end of a determined time period; and
   said controller changing said means for switching to said connected state until said end of said determined time period is communicated from said means for timing.

6. The receptacle access control system of claim 1 additionally comprising:
   means of removable attachment of said transponder to one of said plug or said receptacle.

7. The receptacle access control system of claim 2 additionally comprising:
   means of removable attachment of said transponder to one of said plug or said receptacle.

8. The receptacle access control system of claim 2 additional comprising:
   data processing means to receive said authorization code when broadcast by said transponder and compare said authorization code with a list of preauthorized codes to determine if said authorization code is a match to one of said list;
   said data processing means communicating said match to said controller only for the duration of time said transponder is in said energized state and continues to broadcast said authorization code.

9. The receptacle access control system of claim 8 additionally comprising:
   said data processing means programmed to communicate said match to said controller for a predetermined duration of time subsequent to the first broadcast of said authorization code determined to be a match, whether said transponder is in said static state or said energized state.

10. The receptacle access control system of claim 8 additional comprising:
    means to remotely update said list of preauthorized codes.

11. The receptacle access control system of claim 9 additional comprising:
    means to remotely update said list of preauthorized codes.

12. The receptacle access control system of claim 9 additional comprising:
    means to remotely change the duration of said predetermined duration of time.

13. The receptacle access control system of claim 1 wherein access to an AC power supply is controlled.

14. The receptacle access control system of claim 1 wherein access to a computer network is controlled.

15. The receptacle access control system of claim 2 wherein access to an AC power supply is controlled.

16. The receptacle access control system of claim 2 wherein access to a computer network is controlled.

17. A method of controlling access to AC power or a communications network employing a receptacle having connectors adapted for cooperative engagement with a plug having corresponding plug connectors, a means for switching having a connected state wherein electrical energy is communicated to said receptacle connectors and having a disconnected state interrupting communication of said electrical energy to at least one of said receptacle connectors, a controller communicating with said means for switching, said controller changing said means for switching to either of said connected state or said disconnected state, means for broadcasting radio frequency energy, a transponder having a static state, and having an energized state only when placed sufficiently adjacent to said means for broadcasting radio frequency energy wherein transponder broadcasts an authorization radio signal comprising the steps of:
    issuing said transponder to a user; and
    having said user locate said transponder sufficiently close to said means for broadcasting radio frequency energy to change said transponder from said static state to said energized state, whereby said transponder broadcasts said authorization radio signal to said controller causing said controller to change said means for switching to said connected state, thereby allowing said AC power to communicate from said receptacle to said plug and any electrical device communicating with said plug.

18. The method of claim 17 including the additional steps of:
    encoding said transponder with a specific authorization code broadcast in said authorization radio signal; and
    encoding said controller with a pre-determined authorization code to thereby change said means for switching to said connected state only if said specific authorization code matches said predetermined authorization code.

19. The method of claim 18 including the additional steps of:
    remotely updating said controller with a new predetermined authorization code prior to issuing said transponder to successive users.

20. The method of claim 17 including the additional steps of:
    providing a means for timing to change said means for switching from said connected state said disconnected state after a determined time period.

* * * * *